United States Patent
Mishima

(10) Patent No.: US 7,212,677 B2
(45) Date of Patent: May 1, 2007

(54) CODER, CODING METHOD, PROGRAM, AND IMAGE FORMING APPARATUS FOR IMPROVING IMAGE DATA COMPRESSION RATIO

(75) Inventor: Nobuhiro Mishima, Okazaki (JP)

(73) Assignee: Minolta Co., Ltd., Osaka-Shi (JP)

( * ) Notice: Subject to any disclaimer, the term of this patent is extended or adjusted under 35 U.S.C. 154(b) by 753 days.

(21) Appl. No.: 09/756,924

(22) Filed: Jan. 10, 2001

(65) Prior Publication Data

US 2001/0007595 A1 Jul. 12, 2001

(30) Foreign Application Priority Data

| Jan. 11, 2000 | (JP) | ........................... 2000-002583 |
| Jan. 11, 2000 | (JP) | ........................... 2000-002584 |
| Aug. 25, 2000 | (JP) | ........................... 2000-255829 |

(51) Int. Cl.
*G06K 9/36* (2006.01)

(52) U.S. Cl. ...................... 382/237; 382/240
(58) Field of Classification Search ......... 382/232–249, 382/240, 257, 166; 358/1.9, 1.2, 2.1, 3.06, 358/426.01, 521, 3.08, 426.07, 426.1, 426.16, 358/474, 482; 375/240.24; 341/107.51; 348/396.1
See application file for complete search history.

(56) References Cited

U.S. PATENT DOCUMENTS

| 4,745,473 | A | | 5/1988 | Hall |
| 5,091,977 | A | | 2/1992 | Katata et al. |
| 5,335,088 | A | | 8/1994 | Fan |
| 5,471,207 | A | | 11/1995 | Zandi et al. |
| 5,631,977 | A | | 5/1997 | Koshi et al. |
| 5,659,631 | A | | 8/1997 | Gormish et al. |
| 5,881,173 | A | * | 3/1999 | Ohmori ...................... 382/232 |
| 5,960,117 | A | * | 9/1999 | Hiratani ...................... 382/239 |
| 6,072,909 | A | * | 6/2000 | Yokose et al. .............. 382/247 |
| 6,160,640 | A | | 12/2000 | Ohmori |
| 6,215,421 | B1 | * | 4/2001 | Kondo et al. ................. 341/50 |
| 6,510,247 | B1 | * | 1/2003 | Ordentlich et al. ......... 382/232 |
| 6,538,771 | B1 | | 3/2003 | Sakatani et al. |

FOREIGN PATENT DOCUMENTS

| JP | 2-308672 | 12/1990 |
| JP | 7-58945 | 3/1995 |
| JP | 9-284438 | 10/1997 |
| JP | 10-210293 | 8/1998 |
| JP | 10-271299 | 10/1998 |
| JP | 11-55530 | 2/1999 |

OTHER PUBLICATIONS

★Translation of Notification of Reasons for Refusal issued in a corresponding Japanese application.

* cited by examiner

*Primary Examiner*—Ishrat Sherali
(74) *Attorney, Agent, or Firm*—Buchanan Ingersoll & Rooney PC

(57) ABSTRACT

The present invention discloses a coder and a coding method that raise the possibility of improving the compression ratio of multivalued image data in which one pixel consists of a plurality of bits and are accordingly effective to increase the amount of image that is stored in a recording medium with a certain capacity. The coder according to the present invention includes an obtaining unit for obtaining a predetermined amount of image data in which one pixel consists of a plurality of bits, a developing unit for developing on the virtual plane each piece of the bit data in the obtained image data, and a coding unit for performing the entropy coding on the developed bit data.

27 Claims, 17 Drawing Sheets

FIG.6A

|   | X | X | X |   |
|---|---|---|---|---|
| X | X | X | X | A |
| X | X | ? |   |   |

FIG.6B

|   | X | X | X | X | X | A |
|---|---|---|---|---|---|---|
| X | X | X | X | ? |   |   |

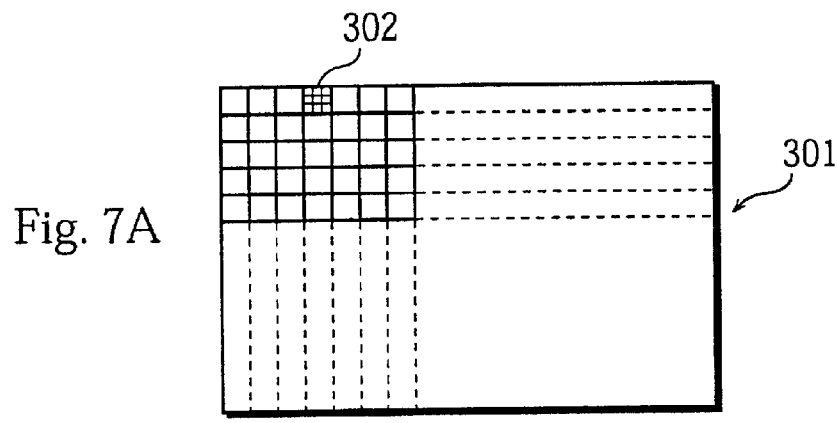
Fig. 7A
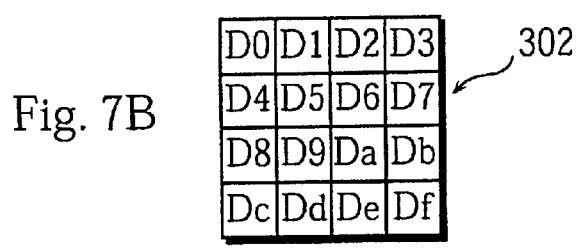
Fig. 7B
Fig. 7C
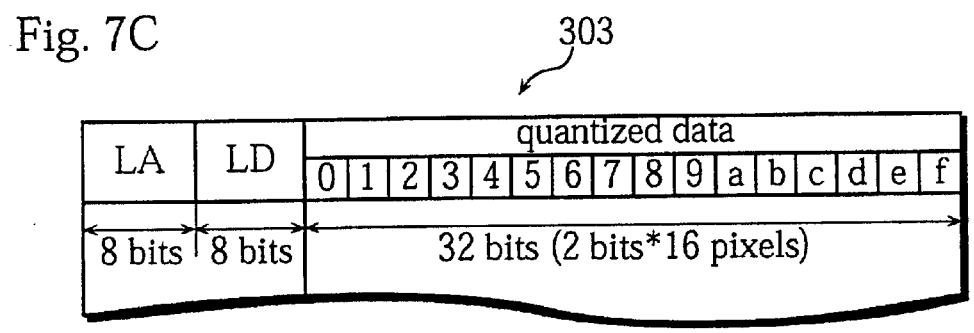

FIG.14

| A**[7] | B**[7] | A**[6] | B**[6] |
|---|---|---|---|
| B**[5] | A**[5] | B**[4] | A**[4] |
| A**[3] | B**[3] | A**[2] | B**[2] |
| B**[1] | A**[1] | B**[0] | A**[0] |

FIG.15

| | binary data | | gray codes |
|---|---|---|---|
| 0 | 0 0 0 0 | 0 | 0 0 0 0 |
| 1 | 0 0 0 1 | 1 | 0 0 0 1 |
| 2 | 0 0 1 0 | 2 | 0 0 1 1 |
| 3 | 0 0 1 1 | 3 | 0 0 1 0 |
| 4 | 0 1 0 0 | 4 | 0 1 1 0 |
| 5 | 0 1 0 1 | 5 | 0 1 1 1 |
| 6 | 0 1 1 0 | 6 | 0 1 0 1 |
| 7 | 0 1 1 1 | 7 | 0 1 0 0 |
| 8 | 1 0 0 0 | 8 | 1 1 0 0 |
| 9 | 1 0 0 1 | 9 | 1 1 0 1 |
| a | 1 0 1 0 | a | 1 1 1 1 |
| b | 1 0 1 1 | b | 1 1 1 0 |
| c | 1 1 0 0 | c | 1 0 1 0 |
| d | 1 1 0 1 | d | 1 0 1 1 |
| e | 1 1 1 0 | e | 1 0 0 1 |
| f | 1 1 1 1 | f | 1 0 0 0 |

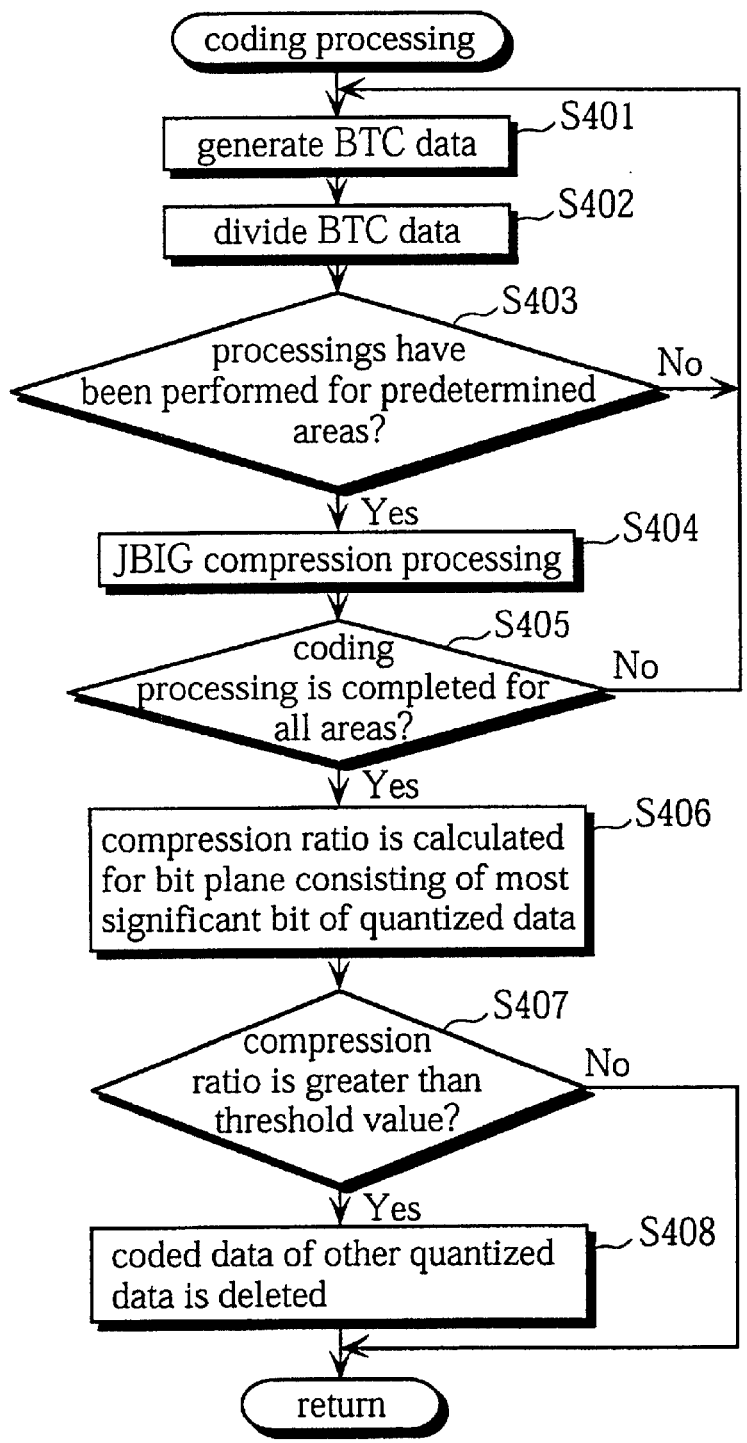

CODER, CODING METHOD, PROGRAM, AND IMAGE FORMING APPARATUS FOR IMPROVING IMAGE DATA COMPRESSION RATIO

This application is based on application Nos. 2000-2583, 2000-2584, and 2000-255829 filed in Japan, the contents of which are hereby incorporated by reference.

BACKGROUND OF THE INVENTION (1) Field of the Invention

The present invention relates to a coder and a coding method for coding multivalued image data in which the pixel value of one pixel is expressed by a plurality of bits, a program for realizing the coding processing of the multivalued image data, and an image forming apparatus.

(2) Description of the Conventional Art

Recently, an image forming apparatus equipped with a so-called memory recall function has been realized. The image forming apparatus with the memory recall function stores in a memory the image data of an image for which image forming has been performed and reads the image data from the memory for image forming when receiving user instruction to perform image forming again, for instance.

With the image recall function, an original document needs not to be read again using the image reader and the like or the image data needs not to be transmitted again from an external apparatus such as the personal computer (referred to as the "PC" in this specification) when the image data stored in the memory is used. Accordingly, the larger amount of image in the memory, the more improved usability.

However, a larger memory capacity for a larger amount of stored image raises the manufacturing cost of the image forming apparatus. This is problematic. This problem may arise when the number of pages to be sorted is increased for the so-called electronic sorting function by which image data is once stored in the memory and a plurality of printed papers are sorted when output. Also, the problem noticeably arises for the full-color image forming apparatus that stores image data in the memory for each of the reproduction colors, yellow, cyan, magenta, and black.

In order to prevent the manufacturing cost raise due to memory capacity increase, image data is compressed when stored in the memory. For this purpose, a variety of methods of coding image data have been developed. Here, an explanation of coding processing will be given as an example of coding method as a related art. According to the coding method, a plurality of bit planes are generated from multivalued image data in which the pixel value of one pixel is expressed by a plurality of bits. Also, each of the generated bit planes is coded.

FIGS. 1A and 1B are diagrams for explaining the above-mentioned related art. According to this method, multivalued image data 900 with 256 gradation levels in which the pixel value of one pixel is expressed by 8 bits as shown in FIG. 1A (only 16 pixels are illustrated in FIG. 1A) is divided into 8 bit planes 901 to 908 as shown in FIG. 1B. Then, the multivalued image data 900 is coded by the bit plane using the method of arithmetic coding stipulated by the JBIG (Joint Bi-level Image experts Group), for instance.

However, coding by the bit plane is also problematic. For instance, among the 8 bit planes 901 to 908, the pixel value distribution in the original image almost remains in the bit plane 901 that consists of the most significant bits. As a result, relatively a good compression ratio is realized even in the arithmetic coding. On the other hand, in the order of the bit planes 902, 903, 904, ..., and 908, the bits in a bit plane become less significant, and a bit plane has less relation with the original image. It is well known that the bit plane consists of less significant bits shows a so-called "white noise pattern". The white noise pattern is a random image totally different from the natural image in characteristics and properties. As a result, there is a limitation in improving the compression ratio according to the arithmetic coding, for instance.

SUMMARY OF THE INVENTION

It is accordingly the object of the present invention to provide effective means to enable to improve the compression ratio of image data and accordingly increase the amount of image that are stored in a recording medium having a certain capacity.

The above-mentioned object may be achieved by a coder that includes: an obtaining unit that obtains a predetermined amount of image data in which each pixel is expressed by a plurality of bits; a developing unit that develops the pieces of bit data in the image data on virtual planes, wherein pieces of bit data of the same pixel are developed on the same virtual plane; and a coding unit that performs entropy coding on the developed bit data in virtual plane units.

The above-mentioned object may be also achieved by a coder that includes: an obtaining unit that obtains a predetermined number of pixels of multivalued image data; a BTC processing unit that generates gradation characteristic data and quantized data from pixel values of the pixels of the obtained multivalued image data; a developing unit that develops pieces of bit data in the gradation characteristic data on first virtual planes; and a coding unit that performs entropy coding on the developed bit data in first virtual plane units.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 6A and 6B show an example of the so-called template used in the JBIG compression processing;

FIGS. 7A, 7B, and 7C are diagrams for explaining the BTC (Block Truncation Coding) method;

FIG. 14 is a diagram for explaining how to arrange image data by the bit in the composition and the two-dimensional development processing of image data of a plurality of pages;

FIG. 15 is a diagram for explaining the conversion from binary data to gray codes in 4 bits;

FIG. 17 is a flowchart showing the coding processing including reducing processing of quantalization data.

DESCRIPTION OF THE PREFERRED EMBODIMENTS

Here, an explanation of preferred embodiments of a coder according to the present invention will be given by taking a case in which the coder is applied to an image forming apparatus as an example with reference to figures.

(The First Embodiment)

(1) Overall Structure of Image Forming Apparatus

Figure 1A:
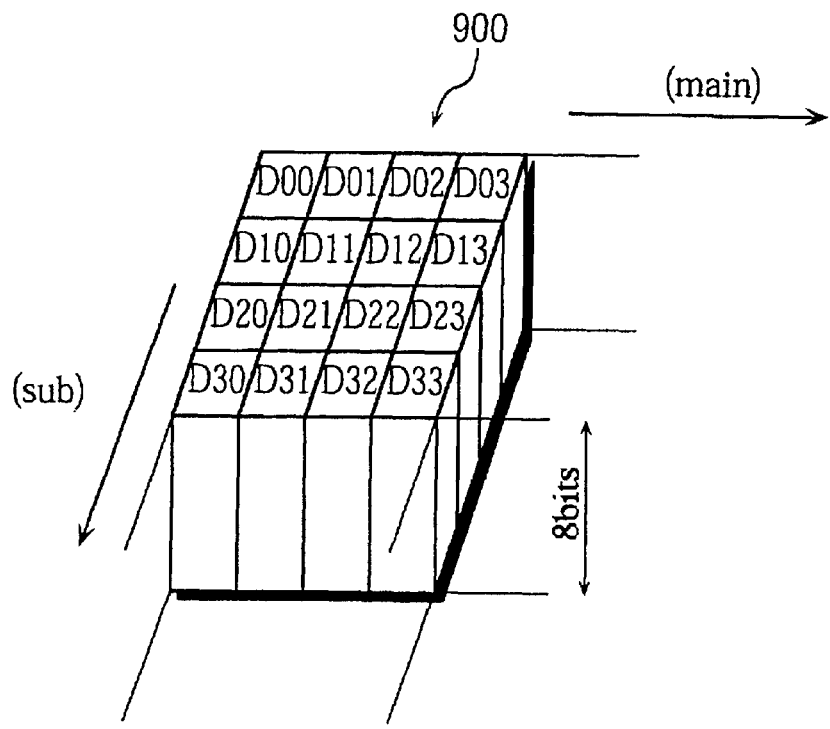
FIGS. 1A and 1B are diagrams for explaining the coding method in a related art.
Figure 1B:
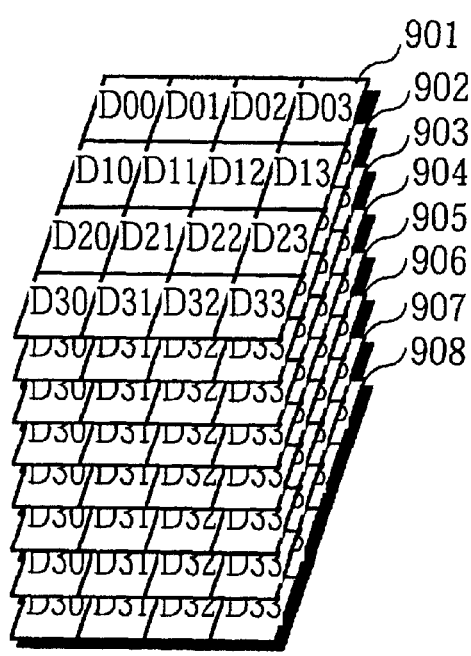
Figure 2:
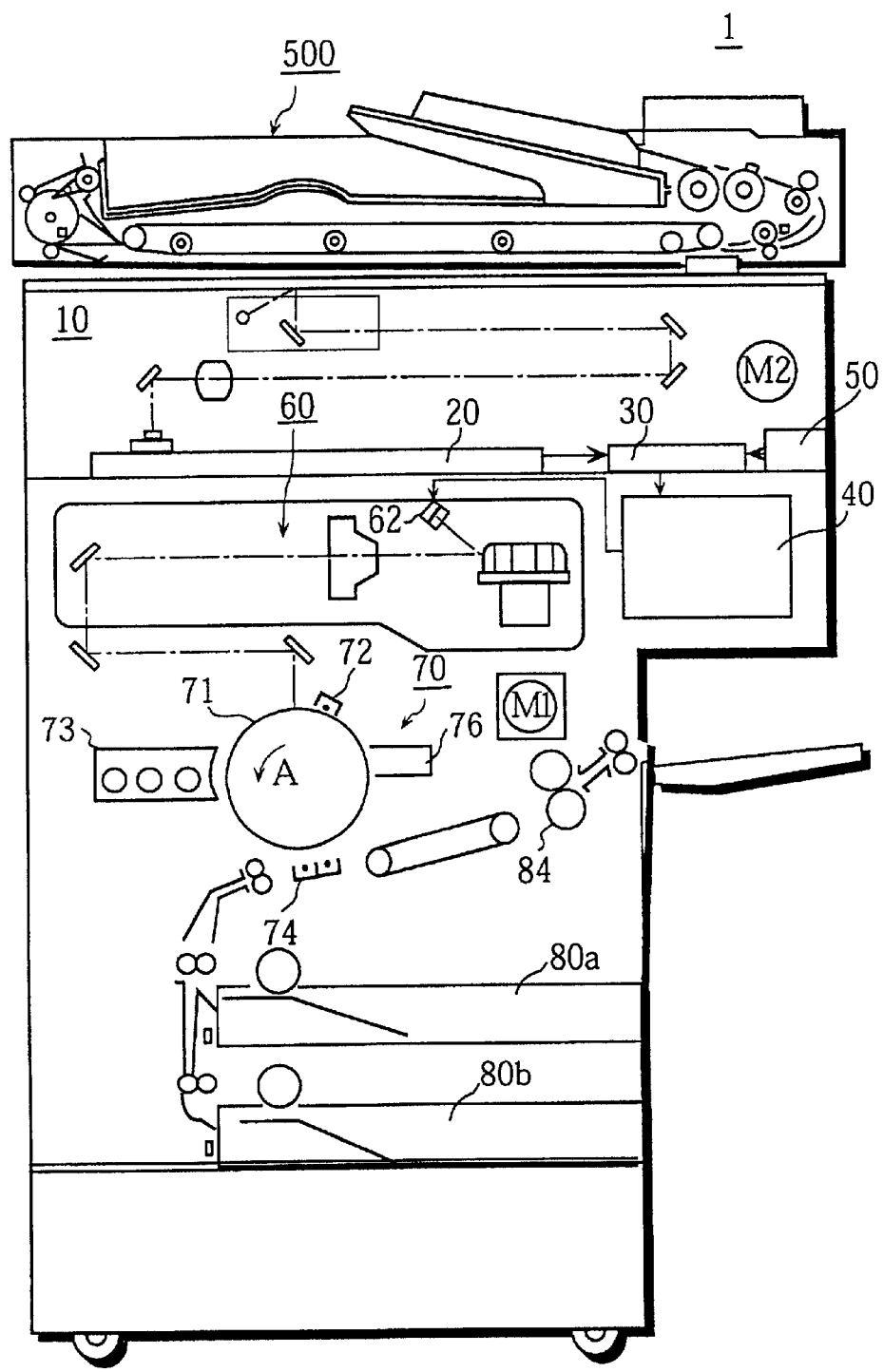
FIG. 2 is a simplified sectional view showing the overall construction of a digital copying machine as an example of the image forming apparatus.

FIG. 2 is a simplified sectional view showing the overall construction of a digital copying machine (referred to as the "copying machine" in this specification) 1 as an example of the image forming apparatus.

The copying machine 1 according to the present embodiment includes a scanning system 10, an image signal processor 20, a memory unit 30, a print processing unit 40, an external interface unit 50, an optical system 60, an image forming system 70, and a document feeder 500. The scanning system 10 reads an original document and converts the document into image signals. The image signal processor 20 processes the image signals transmitted from the scanning system 10. The memory unit 30 codes image data that has been input from the image signal processor 20 and transmitted from an external apparatus such as a PC via a network to store the coded image data in the memory. Also, the memory unit 30 decodes coded image data. The print processing unit 40 drives a semiconductor laser 62 according to the image data output from the memory unit 30. The external interface unit 50 transfers the image data to the memory unit 30 that has been transmitted from the external apparatus via the network. The optical system 60 guides a laser beam from the semiconductor laser 62 to the exposure position on a photoconductive drum 71. The image forming system 70 develops an electrostatic latent image that has been formed by exposure, transfers the developed image onto a recording paper, and fuses the transferred image into the recording paper to form an image. The document feeder 500 feeds the original document and reverses the document upside down when necessary.

Aside from transferring image data from the external apparatus to the memory unit 30, the external interface unit 50 exercises control of control signal and image data exchange with the external apparatus. The image data that has been decoded for image forming and ordinary image data that has not been coded are transferred from the memory unit 30 to the print processing unit 40. According to the image data, the semiconductor laser 62 is driven. The laser beam emitted from the semiconductor laser 62 is deflected by the optical system 60 and guided to the image forming system 70.

In the image forming system 70, the photoconductive drum 71 rotates in the direction of an arrow "A" and the entire surface of the photoconductive drum 71 has been charged by a sensitizing charger 72. The laser beam is applied onto the photoconductive drum 71 to form the electrostatic latent image on the surface of the photoconductive drum 71. When toner is supplied from a developing unit 73, the electrostatic latent image is developed into a visible toner image. The visible toner image is transferred onto the recording paper, which has been transported from paper feed cassettes 80a and 80b, by a transfer charger 74. Then, the recording paper is transported to fixing rollers 84 to fix the toner image onto the recording paper. Eventually, an image is formed on the recording paper.

(2) Coder Structure

Figure 3:
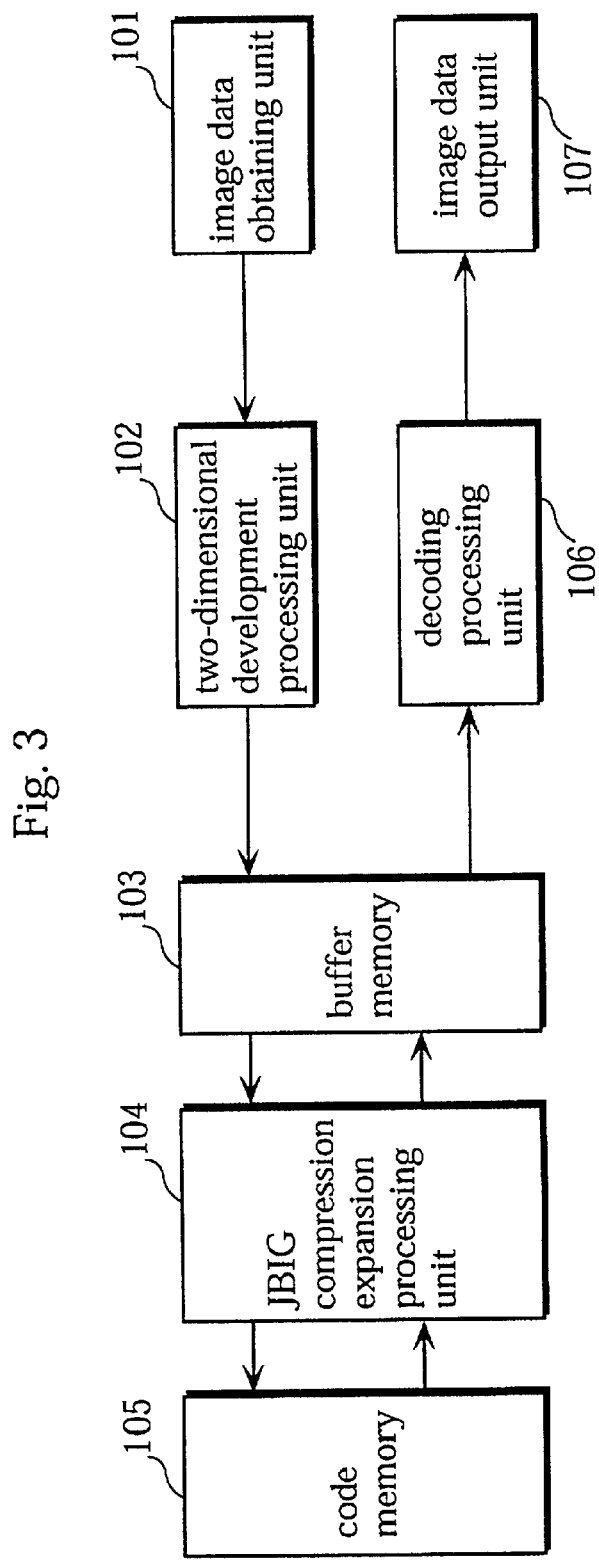
FIG. 3 is a functional block diagram showing the structure of a coder according to the first embodiment of the present invention.

According to the present embodiment, the coder of the present invention is provided in the memory unit 30. Here, an explanation of the structure of the coder of the present invention will be given. FIG. 3 is a functional block diagram showing the structure of the coder according to the first embodiment of the present invention.

The coder according to the present embodiment includes an image data obtaining unit 101, a two-dimensional development processing unit 102, a buffer memory 103, a JBIG compression expansion processing unit 104, and a code memory 105. The image data obtaining unit 101 obtains image data. The two-dimensional development processing unit 102 stores the bits in the buffer memory 103, developing on a virtual plane a plurality of bits which the pixels of the obtained image data consists of. The buffer memory 103 temporarily stores the data that has been developed by the two-dimensional development processing unit 102 for compressing or expanding the data according to the arithmetic coding stipulated in the JBIG. The JBIG compression expansion processing unit 104 compresses and expands the data stored in the buffer memory 103 according to the arithmetic coding. In the code memory 105, the coded data that has been compressed by the JBIG compression expansion processing unit 104. Note that the coded data stored in the code memory 105 is expanded by the JBIG compression expansion processing unit 104. Then, the expanded data undergoes decoding processing by a decoding processing unit 106 before being output via an image data output unit 107.

Into the image data obtaining unit 101, image data transferred from the image signal processor 20 and transmitted from an external apparatus such as a PC via the external interface unit 50 is input. Note that the image data obtained by the image data obtaining unit 101 is the data of a monochrome multivalued image with 256 gradation levels in which one pixel is expressed by 8 bits in the present embodiment. Full-color image data, however, may be applied to the present embodiment. In this case, the image data can be divided into the data of the reproduction colors, i.e., cyan, magenta, yellow, and black to perform coding processing in the present embodiment for each of the color data, for instance.

The two-dimensional development processing unit 102 stores in the buffer memory 103 the values of the bits in the input multivalued image data of which the pixels consist in the form of being developed on the virtual plane. The coder according to the present embodiment raises the possibility of realizing a higher compression ratio in the arithmetic coding with prediction using the template stipulated in the JBIG (referred to the "JBIG compression" in this specification) by developing the multivalued image data on the-virtual plane. In this specification, the development of the multivalued image data on the virtual plane is referred to as the "two-dimensional development". A more-detailed explanation of the two-dimensional development processing will be given later.

On the data stored in the buffer memory 103, the JBIG compression processing is performed by the JBIG compression expansion processing unit 104. The data is associated with the identifier of the image, for instance, and is stored in the code memory 105. The JBIG compression expansion processing unit 104 in the present embodiment is mainly composed of a so-called QM coder and includes two or three line memory. The line memory performs the so-called prediction using the template, which will be described later.

Note that the coded data store in the code memory 105 is decoded by the JBIG compression expansion processing unit 104 and is developed in the buffer memory 103. Then, a reverse processing of the two-dimensional development is performed on the data by the decoding processing unit 106 and is output via the image data output unit 107. More specifically, multivalued image data is reconstructed from the data that has been two-dimensionally developed in the buffer memory 103 and the reconstructed data is output.

(3) Coding Processing

An explanation of the coding processing in the present embodiment will be given below. Note that the operations in the coding processing in the present embodiment is controlled by a controller (not illustrated) that is mainly composed of a CPU.

Figure 4:
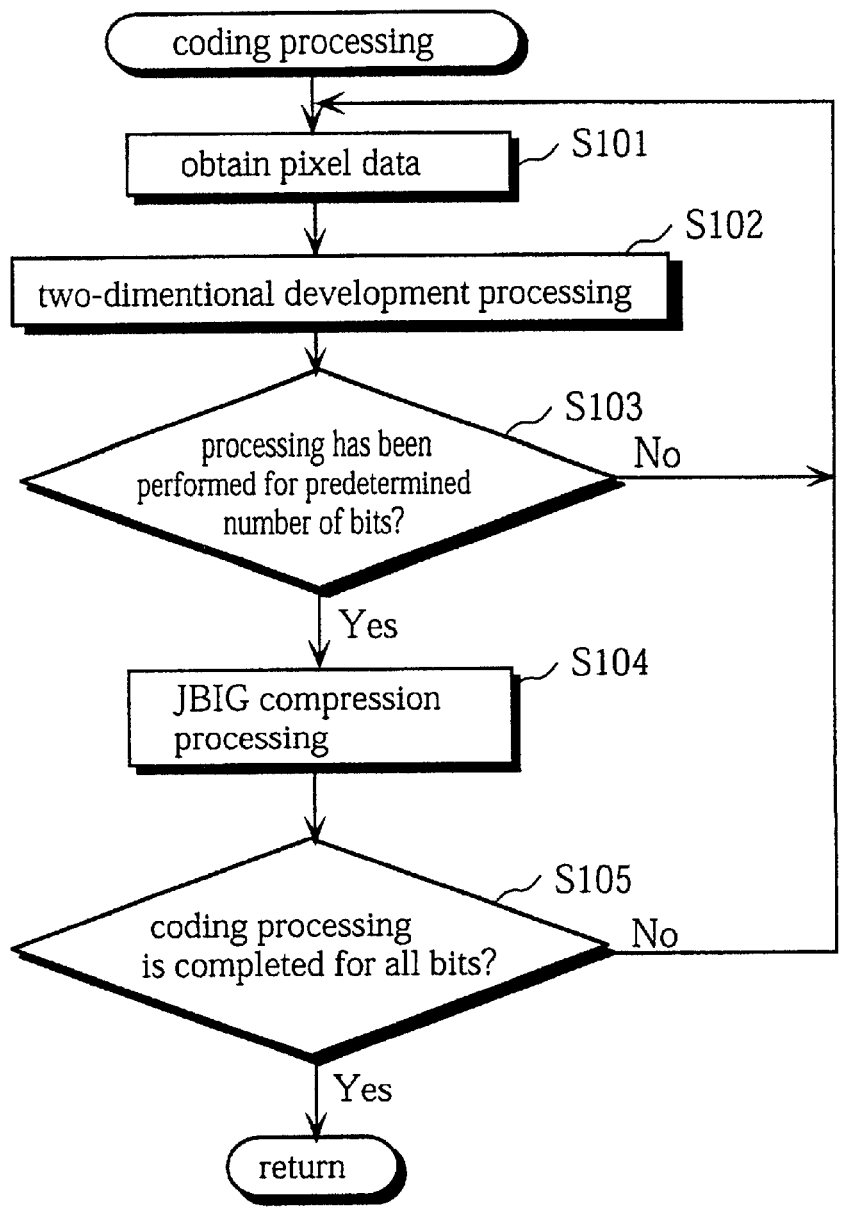
FIG. 4 is a flowchart showing the coding processing in the first embodiment.

FIG. 4 is a flowchart showing the coding processing in the first embodiment. As shown in FIG. 4, when image data is obtained in the coding processing in the present embodiment (step S101), the multivalued image data is two-dimensionally developed (step S102) and is stored in the buffer memory 103. Here, a detailed explanation of the two-dimensional development will be given below.

Figure 5A:
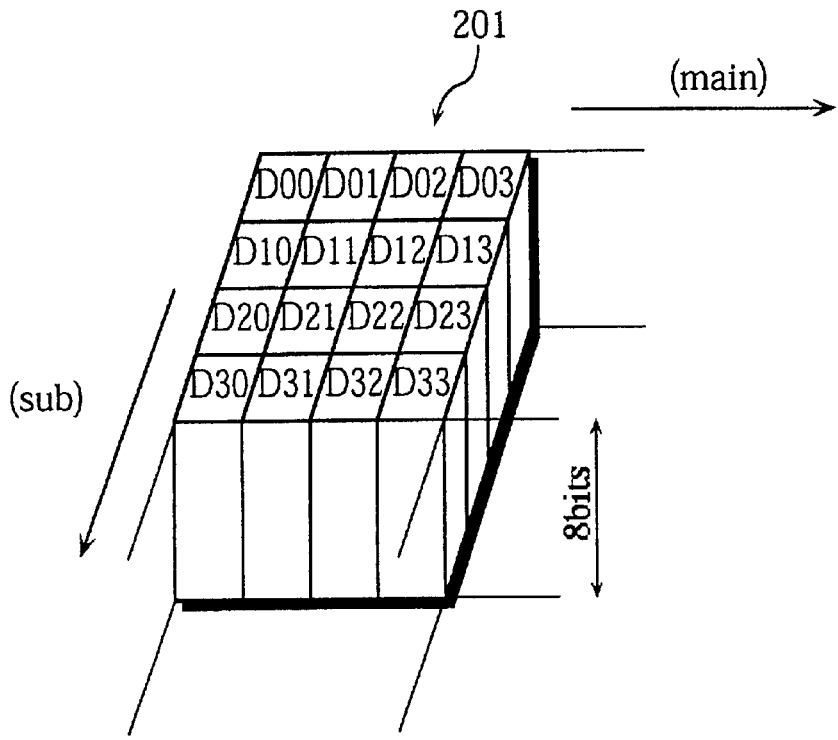
FIGS. 5A and 5B are diagrams for explaining the two-dimensional development processing in the first embodiment.
Figure 5B:
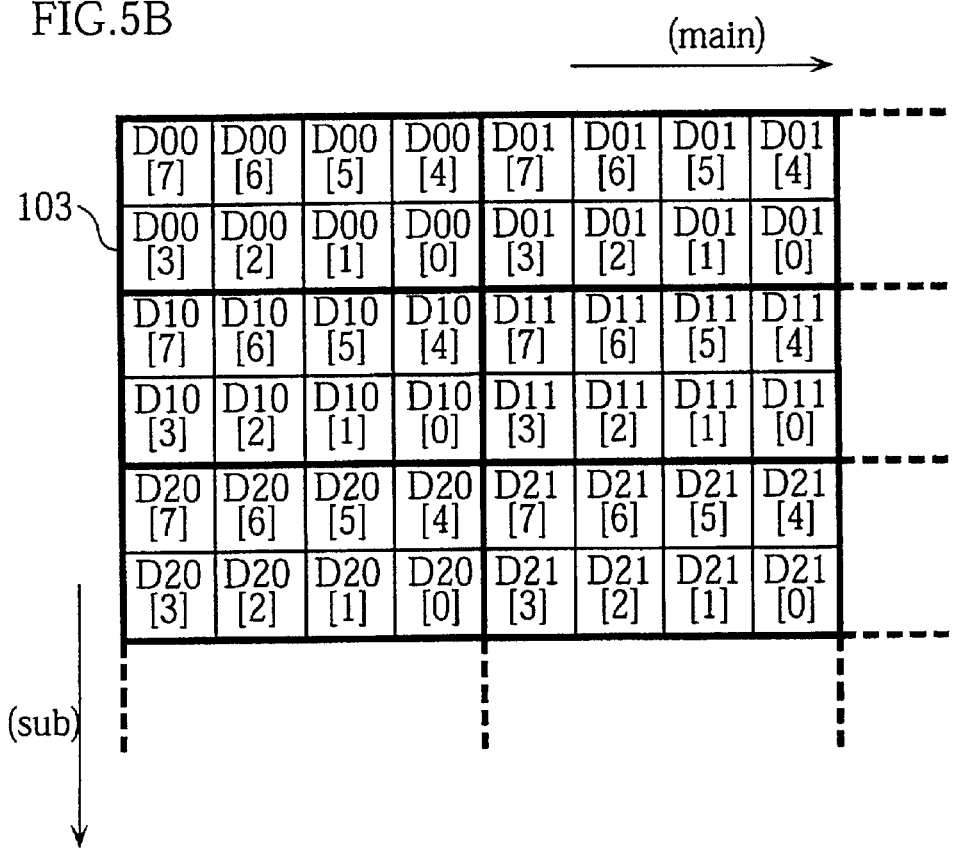

FIGS. 5A and 5B are diagrams for explaining the two-dimensional development processing in the present embodiment. Note that not all the pixels are illustrated in FIGS. 5A and 5B. In the two-dimensional development processing, when multivalued image data 201, in which one pixel is expressed by 8 bits, is stored in the buffer memory 103, 8 bits in one pixel are developed to patterns of 2 bits high*4 bits wide. FIG. 5B shows one example of the form of data that is stored in the buffer memory 103 according to the manner that has been described. In FIG. 5B, reference numbers D00 and D01 indicate that bits D00 and D01 are included in the same pixel in FIG. 5A, for instance. On the other hand, the reference number inside the square brackets indicate the bit significance. For instance, [7] indicates the most significant bit and [0] the least significant bit.

Figures 6A, 6B:
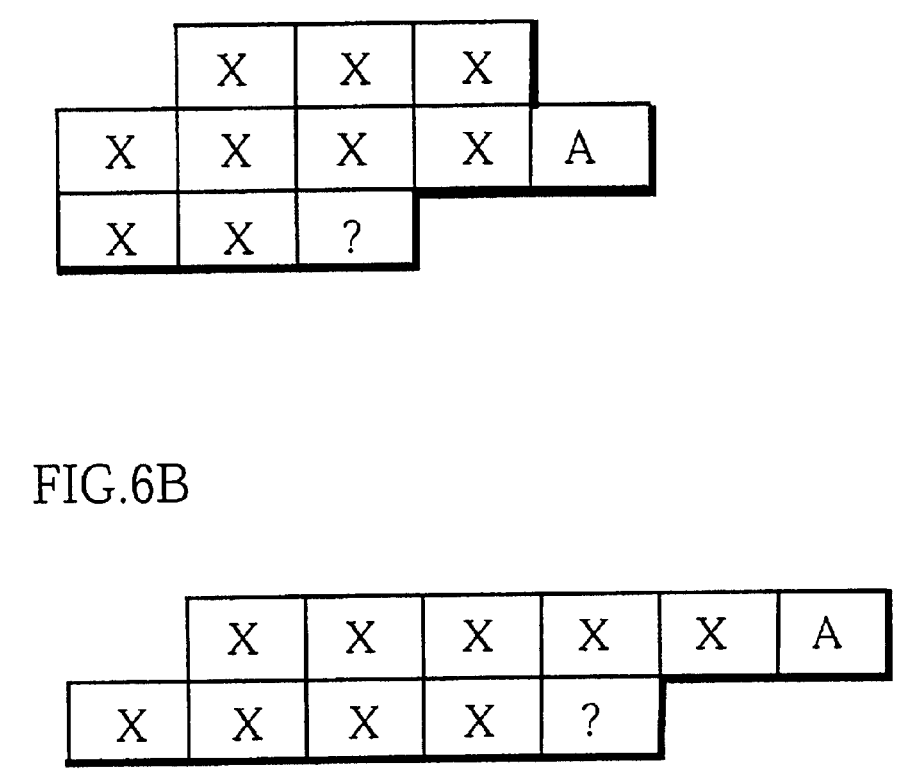

Here, an explanation of why a high compression ratio can be expected in the following JBIG compression by this two-dimensional development processing will be given below. FIGS. 6A and 6B show an example of the so-called template used in the JBIG compression processing. FIG. 6A shows a template that is used when three lines of bit data is referred to. On the other hand, FIG. 6B shows a template used when two lines of bit data is referred to.

In each of the templates, the question mark "?" indicates the bit to be coded (referred to the "target bit" in this specification). The alphabet "X" indicates each bit that is referred to when the target bit is predicted (referred to the "reference bit" in this specification). Note that the alphabet "A" also indicates a reference bit. The bit indicated by the alphabet "A", however, can be moved in a certain range. The template in which the bit indicated by the alphabet "A" has been moved from the initial position is referred to as the "adaptive template (AT)".

In the JBIG compression including prediction using the template described above, the prediction is performed based on the probability value of the target bit corresponding to the bit conditions (Markov conditions) of 10 reference bits. As a result, it is expected that the higher the degree of unevenness of the ratio between the proportions of the values "0" and "1" of the target bit corresponding to the Markov conditions of the reference bits, the more improved the compression ratio.

On the other hand, the bit string in the present embodiment consists of data that is a result of the two-dimensional development of a plurality of bits expressing the pixel value of each pixel of the multivalued image data. The bit string is used only for coding processing and is noticeably different from the ordinary image data, which is the object of the conventional image compression, in characteristics. For instance, the bit string on the two-dimensional virtual plane is not random unlike the case of the ordinary image data. Contrary to the case of the ordinary image data, the bit string is a result of lengthwise and crosswise development of 8 bits of bit string that indicates at least a value of 0 to 255 in the present embodiment. As a result, it is also assumed that the higher the degree of unevenness of the ratio between the proportions of the values "0" and "1" of the target bit corresponding to the Markov conditions of the reference bits, the more improved the compression ratio. Accordingly, it is expected that a quite favorable compression ratio is realized compared with the conventional manner.

According to the principle of the JBIG compression processing, however, it is not always guaranteed that the compression ratio is drastically improved for every kind of image. More specifically, the compression ratio may be different according to the properties of image. For instance, the compression ratio may be different according to whether the image is the character or the photograph and according to the color. Even so, the compression ratio may be drastically improved according to the properties of in some cases.

An important point of the coder in the present embodiment is the two-dimensional development processing. Accordingly, a particularly high compression ratio can be realized by performing the JBIG compression processing using the template that has been described. The coding method is not limited to the one that has been described. Apart from the prediction using the template, the so-called typical prediction (TP) may be used. Other general entropy coding methods such as MH (Modified Huffman) coding method, MR (Modified READ) coding method, and MMR (Modified Modified READ) coding method may be used for coding two-dimensionally developed data. Also, the compression ratio may be improved using the AT.

In the flowchart in FIG. 4 again, when the two-dimensional development processing starts, it is judged when necessary whether the processing has been performed for the bits that is necessary for the JBIG compression processing (step S103). Accordingly, it is judged at step S103 whether the two-dimensional development processing has been performed for the bits for which the prediction using the template can be performed. Every time the two-dimensional development processing is performed for a predetermined number of bits (the result of the judgement at step S103 is "Yes"), more specifically, for each line of the buffer memory 103, the JBIG compression processing is performed (step S104). Then, when the processing is completed for all the bits, which are to be coded, (when the result of the judgement at step S105 is "Yes"), the coding processing of the image data is completed. The coded data is associated with the identifier of the image, for instance, and is stored in the code memory 105. When necessary, the coded data is decoded to be used for image forming.

(The Second Embodiment)

Here, an explanation of the second embodiment of the present invention will be given. In the second embodiment, the explanation will focus on the processing when multivalued image data is compressed according to the BTC method (referred to the "BTC method" in this specification).

The BTC method is a method of compressing image data using the fact that pixels that are positioned close to each other in an original image often have almost the same values. Although the BTC method is a non-reversible compression method, image quality deteriorates little according to the BTC method. Also, rotation processing is performed with ease according to the BTC method. Furthermore, the BTC method can be realized with a relatively simple circuit structure. For this reason, the BTC method is said to be preferable especially for the image forming apparatus. Although the BTC method is well known in the art, an overall explanation will be given below.

FIGS. 7A, 7B, and 7C are diagrams for explaining the BTC method. Here, an explanation of the compression processing will be given with reference to FIGS. 7A, 7B, and 7C taking an example. In this example, a block of 4 pixels high*4 pixels wide is extracted from multivalued image data with 256 gradation levels in which the value of each of the pixels is expressed by 8 bits and the block is compressed according to the BTC method.

As shown in FIG. 7A, a data block (for instance, a block 302) of 4 pixels high*4 pixels wide (16 pixels in total) is extracted from image data 301 one by one and the processing described below is performed for each of the blocks. FIG. 7B indicates an extracted block of 16 pixels. In FIG. 7B, each of the reference numbers D0, D1, ..., Df indicates one pixel.

First, from the values of the 16 pixels in the block, the values of the maximum gradation level (QMAX) and the minimum gradation level (QMIN) are obtained. More specifically, the largest pixel value and the smallest pixel value are obtained from the values of the 16 pixels.

Next, the values of average data (LA) and gradation dynamic range (LD) are obtained. The LA value is obtained by halving the sum of the QMAX and QMIN values. The LD value is obtained by subtracting the QMIN value from the QMAX value. Both of the LA and LD values are expressed by 8 bits. Then, the values of LMAX and LMIN (quantized reference) are obtained. The LMAX and LMIN values are threshold values used when each of the values of the 16 pixels is quantized. More specifically, the LMAX and LMIN values are expressed by Equations 1 and 2 given below.

LMAX=(3*QMAX+QMIN)/4    (Equation 1)

LMIN=(QMAX+3*QMIN)/4    (Equation 2)

Using the values that have been obtained according to the Equations 1 and 2, quantization processing of the 16 pixels in the block 302 are performed. Here, an explanation of how to quantize each of the pixels to 2 bits will be given. When a pixel value is greater than the LMAX value, the quantization bit is set as "11". On the other hand, when a pixel value is greater than the LA value but no greater than the LMAX value, the quantization bit is set as "10".

Meanwhile, when a pixel value is greater than the LMIN value but no greater than the LA value, the quantization bit is set as "01". When a pixel value is no greater than the LMIN value, the quantization bit is set as "00". As a result, compressed data as shown in FIG. 7C (referred to the "BTC data" in this specification) is obtained. BTC data 303 shown in FIG. 7C includes the LA and LD values (referred to the "gradation characteristic data" in this specification), and quantized data expressed by 32 bits (2 bits*16 pixels). Since the BTC data is a result of the compression of the 16 pixels of image data, each of which is expressed by 8 bits, to 48 bits, the amount of data is compressed to the three eighths of the original data amount.

Figure 8:
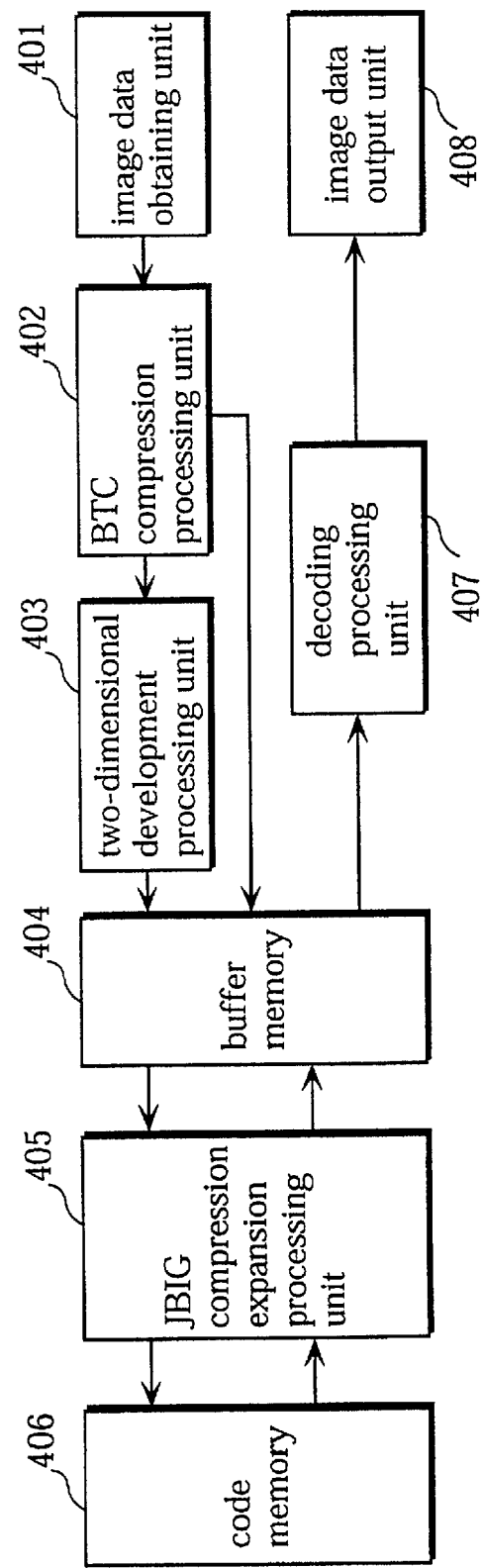
FIG. 8 is a functional block diagram showing the structure of a coder according to the second embodiment.

Note that the characteristic data that has been obtained according to the BTC method is two-dimensionally developed to perform the JBIG compression processing in the present embodiment. FIG. 8 is a functional block diagram showing the structure of the coder according to the second embodiment. Here, an explanation will be focused on a BTC compression processing unit 402, a two-dimensional development processing unit 403, and a decoding processing unit 407. Since the other elements are the same as in the first embodiment, no detailed explanation will be given to these elements.

The BTC compression processing unit 402 performs the image compression according to the BTC method as has been described to obtain the gradation characteristic data and the quantized data. Then, the gradation characteristic data is transferred to the two-dimensional development processing unit 403, while the quantized data is transferred to the buffer memory 404 as it is. The two-dimensional development processing in the two-dimensional development processing unit 403 is the same as in the first embodiment except for processing the gradation characteristic data.

Also, in the method that has been described, the compression ratio of gradation characteristic data in the JBIG compression can be improved compared with the conventional manner to perform the JBIG compression on the BTC data that has been obtained according to the BTC method. As a result, the compression ratio of the image data as a whole can be improved. Note that in the decoding processing unit 407, BTC data can be obtained by performing the reverse processing of the coding on the data that has been developed on the buffer memory 404 as in the case of the coding. Furthermore, image data can be obtained by performing the ordinary decoding processing on the BTC data. The conventional method can be used for the ordinary BTC data decoding processing, so that no detailed explanation of the decoding processing will be given here.

(The Third Embodiment)

Here, an explanation of the third embodiment will be given below.

Figure 9:
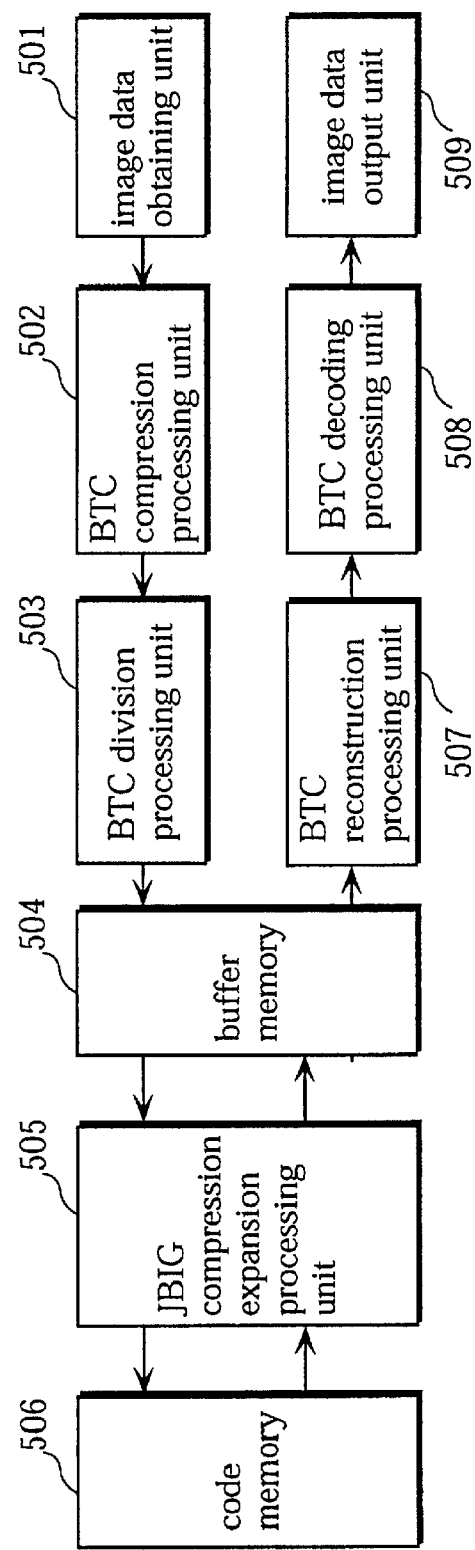
FIG. 9 is a functional block diagram showing the structure of a coder according to the third embodiment.

FIG. 9 is a functional block diagram showing the structure of the coder according to the third embodiment. The coder in the present embodiment includes an image data obtaining unit 501, a BTC compression processing unit 502, a BTC division processing unit 503, a buffer memory 504, a JBIG compression expansion processing unit 505, and a code memory 506. The image data obtaining unit 501 obtains image data. The BTC compression processing unit 502 performs the fixed length coding on the obtained image data according to the BTC method to obtain BTC data. The BTC division processing unit 503 divides the obtained BTC data and stores the BTC data in the buffer memory 504 in the form of being developed on the virtual plane. The buffer memory 504 temporarily stores the divided BTC data (referred to the "divided BTC data" in this specification) for compressing or expanding of the divided BTC data using the JBIG compression method. The JBIG compression expansion processing unit 505 compresses or expands the divided BTC data that has been stored in the buffer memory 504 according to the JBIG compression method. The code memory 506 stores the coded data that has been compressed by the JBIG compression expansion processing unit 505. Note that the coded data is associated with the identifier indicating the image data, for instance, and is stored in the code memory 506. When decoded, the stored coded data is expanded by the JBIG compression expansion processing unit 505 and is stored in the buffer memory 504. Then, after reconstructing processing of the BTC data by a BTC reconstruction processing unit 507 and the decoding processing by a BTC decoding processing unit 508, the data is output via an image data output unit 509.

Into the image data obtaining unit 501, image data is input that has been transferred from the image signal processor 20 and transmitted from an external apparatus such as a PC. In the present embodiment, data of a monochrome image with 256 gradation levels in which one pixel is expressed by 8 bits is input.

The BTC compression processing unit 502 generates BTC data from input image data. The processing for generating the BTC data has been explained, so that no detailed explanation will be given here.

The BTC division processing unit 503 divides the BTC data into gradation characteristic data and two groups of bit data, each of which is generated from bits in the same position of each piece of the quantized data that corresponds to one pixel, and stores the divided BTC data into the buffer memory 504 in the form of being developed on the two-dimensional plane. As described later, the gradation characteristic data and the two groups of bit data are stored in buffer memories 504a, 504b, and 504c, respectively. The coder according to the present embodiment raises the possibility of realizing a higher compression ratio in the JBIG compression, for instance, by performing the division processing on BTC data. A more detailed explanation of the division processing of BTC data and the two-dimensional development of divided BTC data will be given later.

The data stored in the buffer memory 504 undergoes the JBIG compression processing in the JBIG compression expansion processing unit 505 and is stored in the code memory 506. Since the JBIG compression expansion processing unit 505 is the same as in the first embodiment, no detailed explanation will be given here.

Note that the coded data stored in the code memory 506 is decoded by the JBIG compression expansion processing unit 505. After the decoded data is expanded on the buffer memory 504, the BTC reconstruction processing unit 507 performs the reverse processing of the division processing by the BTC division processing unit 503, i.e., decoding processing, on the BTC data. Then, the BTC decoding processing unit 508 performs the reverse processing of the coding processing by the BTC compression processing unit 502 on the data and the data is output via the image data output unit 509. As has been described, even though quantized data is decoded in the BTC decoding processing unit 508, the same image as the original image cannot be reproduced from the quantized data. As a result, the image according to the decoded image data is different from the original image in the strict sense (non-reversible compression). An explanation of the decoding processing and the reconstruction processing of BTC data according to the present embodiment will be given later.

Here, an explanation of the coding processing according to the present embodiment will be given below.

Figure 10:
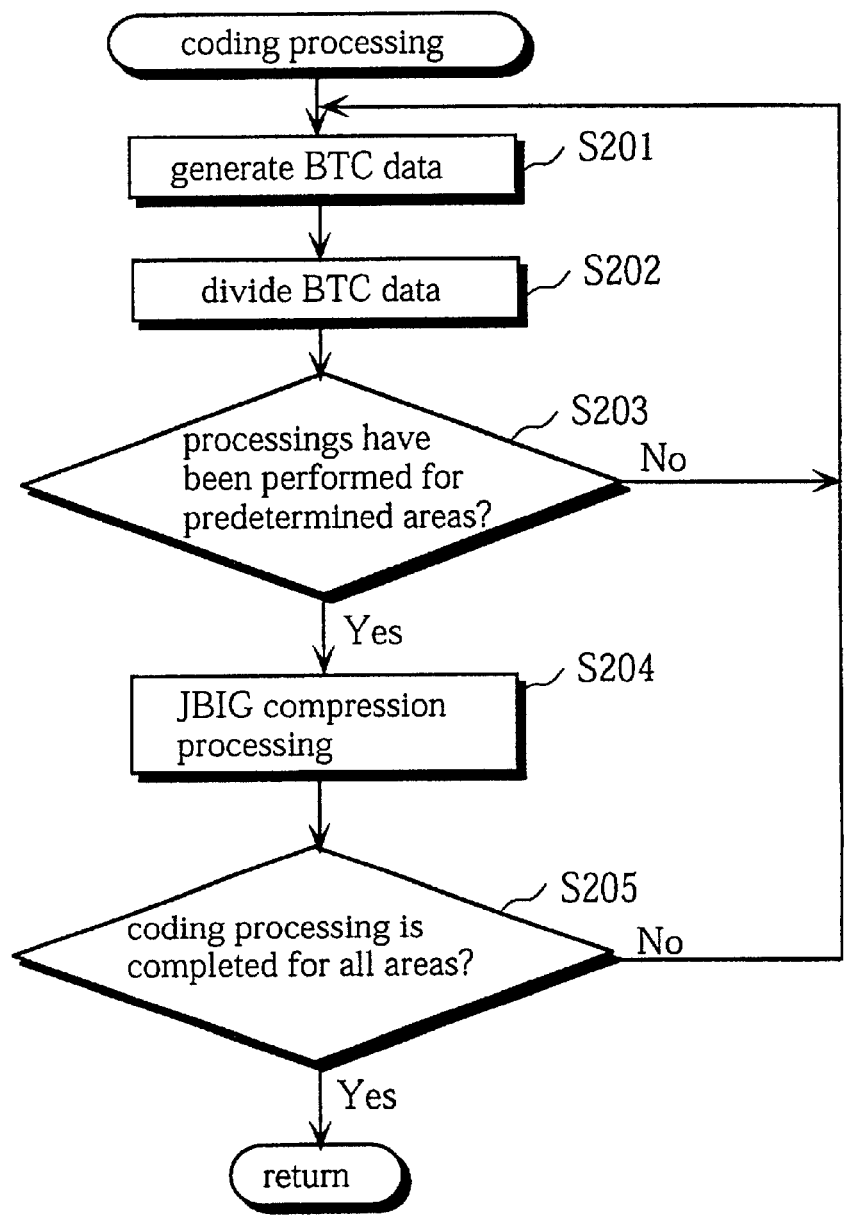
FIG. 10 is a flowchart showing the coding processing in the third embodiment.

FIG. 10 is a flowchart showing the coding processing in the present embodiment. As shown in FIG. 10, when image data is obtained, BTC data is generated (step S201), the division processing and the two-dimensional development processing are performed on the BTC data to store the data in the buffer memory 504 (step S202) as has been described in the image coding processing according to the present embodiment. Here, a more-detailed explanation of the division processing and two-dimensional development processing of BTC data will be given.

Figure 11:
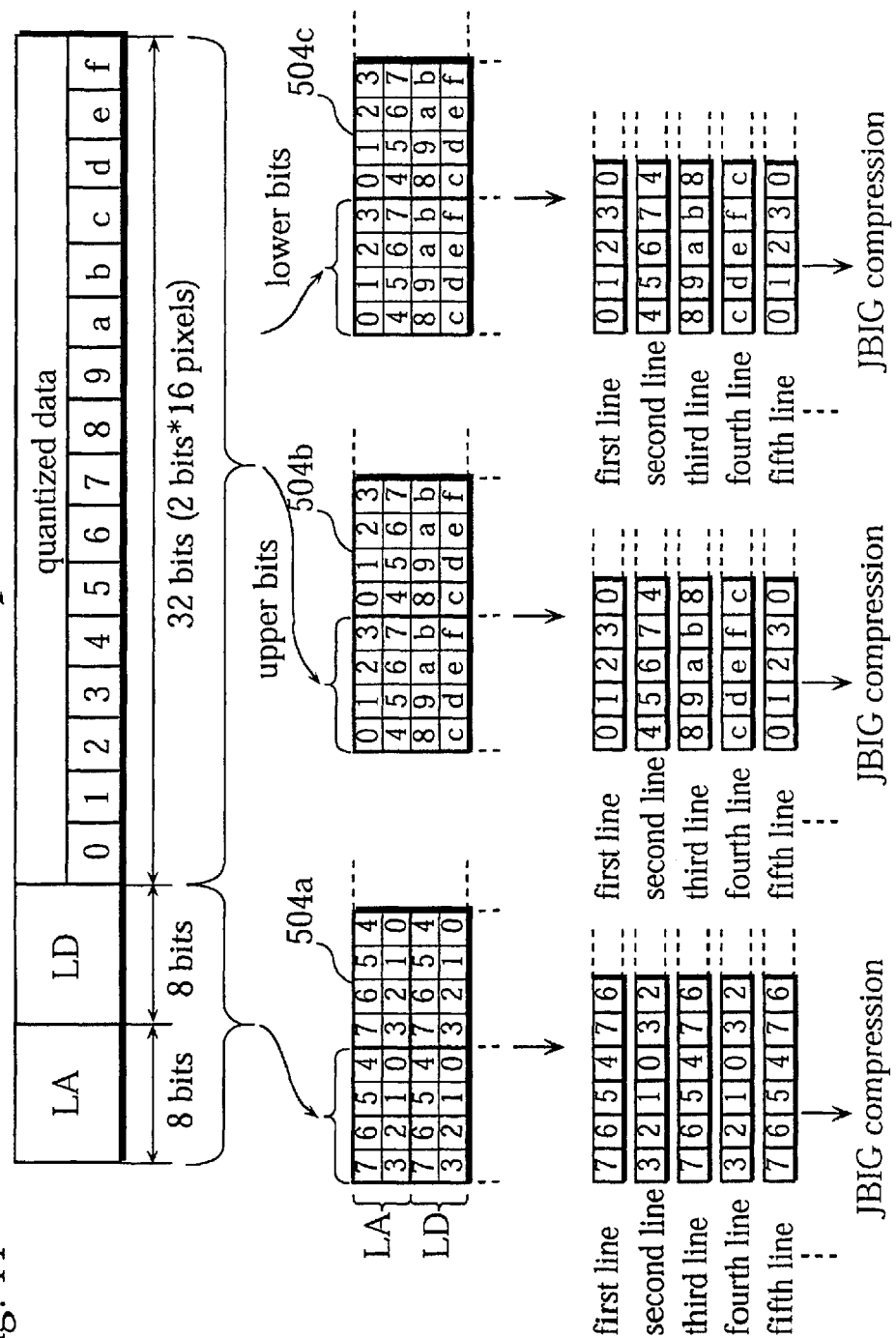
FIG. 11 is diagrams for explaining the division processing of BTC data and the two-dimensional development processing of divided BTC data in the third embodiment.

FIG. 11 is diagrams for explaining the division processing of BTC data and the two-dimensional development processing of the divided BTC data in the present embodiment. As shown in FIG. 11, the BTC data 303 is divided into three groups, i.e., the gradation characteristic data composed of the LA and LD values (8 bits*2=16 bits per block), the upper bits (16 bits per block) of the quantized data (2 bits per pixel), and the lower bits (16 bits per block) of the quantized data, when stored in the buffer memory 504 in the division processing and the two-dimensional development processing of BTC data. Then, the three divided 16 bits are two-dimensionally developed to be 4 pixels high*4 pixels wide and are stored in the buffer memories 504a to 504c, respectively. This processing is performed for each of the blocks extracted from the image data and the data is stored in the buffer memories 504a to 504c in order. Note that the data is arranged in block units in the buffer memories 504a to 504c so as to keep the arrangement for the original image data in the present embodiment. The arrangement, however, can be changed.

In the flowchart in FIG. 10 again, when the division processing and the two-dimensional development processing have been performed on BTC data for a predetermined area (the result of the judgement at step S203 is "Yes"), the JBIG compression processing is performed on the divided BTC data stored in the buffer memories 504a to 504c in one line units (step S204). Here, it is judged that the processings have been performed for predetermined areas when the JBIG compression processing in one line units becomes possible. More specifically, when the 4 pixels high*4 pixels wide blocks are arranged in all the areas in the horizontal direction in the buffer memories 504a to 504c (four columns of data are arranged in the vertical direction), for instance, it is judged that the processings have been performed for the predetermined areas.

Note that the following JBIG compression processing (step S204) is performed for the data stored in the buffer memories 504a to 504c in parallel in the present embodiment. For this purpose, the number of JBIG compressors corresponding to the number of the divided BTC data groups (three in the present embodiment) may be operated in parallel. Also, a small number of high-speed compressor may operates according to the time sharing system.

Figure 12:
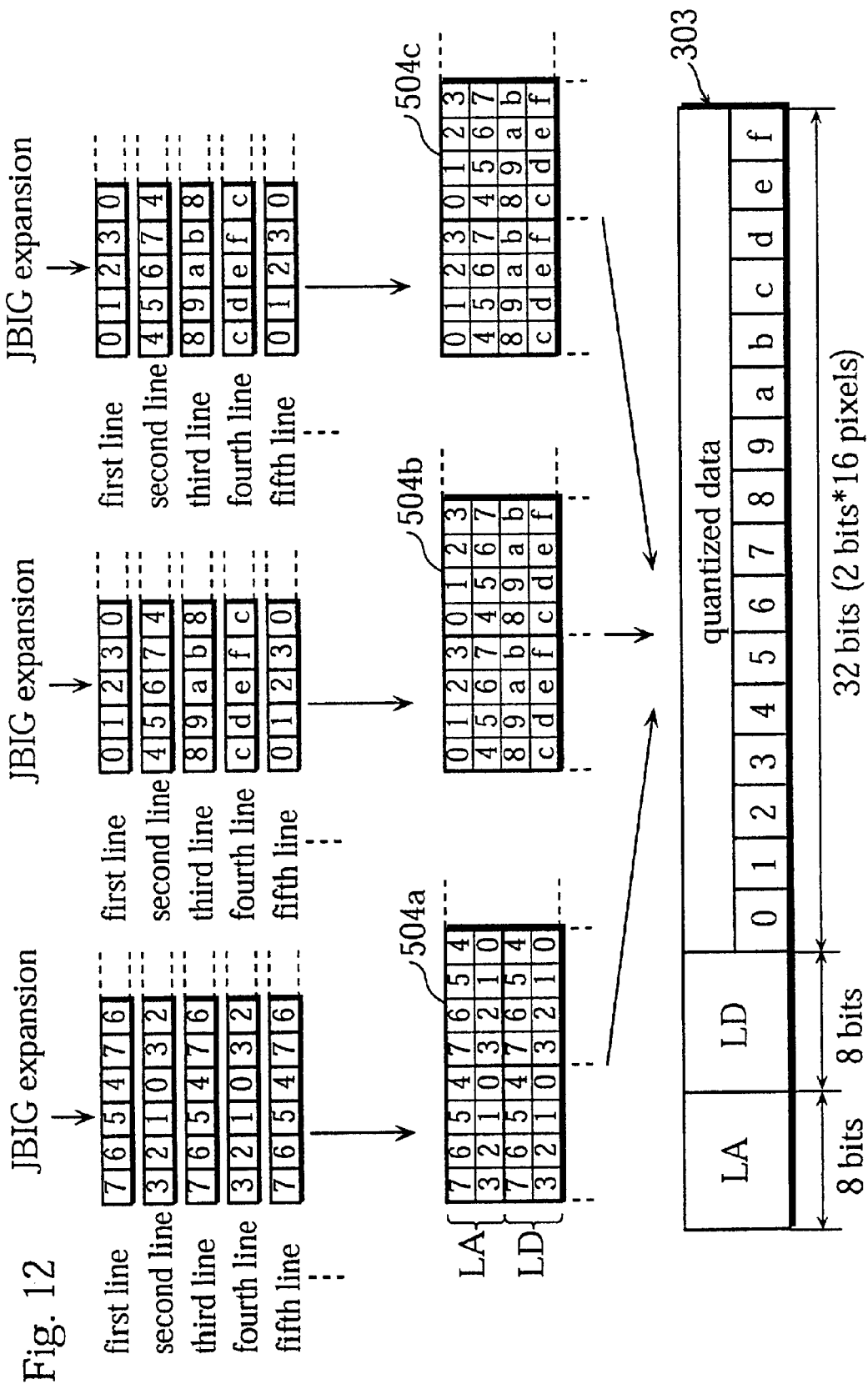
FIG. 12 is diagrams for explaining decoding of coded data in the third embodiment.

When the coding processing is completed for all the areas (the result of the judgement at step S205 is "Yes") as has been described, each piece of the data that has been coded in the JBIG compression processing is associated with the identifier that indicates the original image data, for instance, and is stored in the code memory 506. Here, the coding processing is completed. Note that the coded data can be decoded with ease by the reverse processing of the coding processing that has been explained. More specifically, the coded data in the divided groups is expanded by the BTC compression expansion processing unit 505 to reconstruct the divided BTC data in the buffer memories 504a to 504c as shown in FIG. 12.

The reconstructed divided BTC data 504a to 504c is stored in the buffer memory 504 and the data is rearranged in the BTC reconstruction processing unit 507 to reconstruct the BTC data 303. Since a well-known method can be used in the decoding processing of the BTC data 303 by the BTC decoding processing unit 508, no detailed explanation of the decoding processing will be given here.

Note that basically for the same reason as in the first embodiment, a high compression ratio can be expected in the JBIG compression by dividing and two-dimensionally developing BTC data.

More specifically, the two-dimensionally developed gradation characteristic data is different from the BTC data, which is the subject of the JBIG compression in the conventional method, in the characteristics. The two-dimensionally developed gradation characteristic data is the bit string only including gradation characteristic data. Accordingly, it is assumed that the bit string on the virtual plane is not random unlike the case of the ordinary natural image. It is also assumed that the probability is significantly high that the values of the target bit corresponding to the Markov conditions of the reference bits is "0" or "1" compared with the conventional BTC data.

On the other hand, it is highly probable that the bit data obtained from the quantized data, especially, the data only including the upper bits have the same values for the pixels that are positioned close to each other as in the case of the original image data. As a result, the compression ratio is expected to improve compared with the conventional case in which the upper and lower bits are mixed when coded. Accordingly, it is assumed that the compression ratio of the entire image can be drastically improved by the BTC data division.

According to the principle of the JBIG compression processing, however, it is not always guaranteed that the compression ratio is drastically improved for every kind of image as in the case of the first embodiment. More specifically, the compression ratio may be different according to the properties of image. For instance, the compression ratio may be different according to whether the image is the character or the photograph and according to the color. Even so, the compression ratio may be drastically improved according to the properties of in some cases.

An important point of the coding processing in the present embodiment is the BTC data division. Accordingly, a particularly high compression ratio can be realized by performing the JBIG compression processing on the divided BTC data that has been described. The coding method is not limited to the one that has been described. Apart from the prediction using the template, the so-called TP may be used. Other general entropy coding methods such as MH coding method, MR coding method, and MMR coding method may be used for coding divided BTC data. Also, the compression ratio may be improved using the AT.

In addition, an explanation has been given for the case in which the two-dimensional development processing is performed on the three groups of divided BTC data (the gradation characteristic data, the upper bits of the quantized data, and the lower bits of the quantized data) in the present embodiment. However, the two-dimensional development processing may be performed on only one of the three groups, for instance, on the gradation characteristic data and other groups may be coded without the two-dimensional development processing. As has been described, the compression ratio can change according to the properties of image. Accordingly, the coding method is not limited to the one in the present embodiment. A variety of specific coding methods can be used.

(Possible Modifications)

Explanations of the present invention has been given according to the first to third embodiments. The present invention, however, is not limited to the specific examples that have been explained in the embodiments. Here, other possible modifications will be given below.

(1) In the first and second embodiments, the two-dimensional development processing and the coding processing are performed on one page of multivalued image data. Recently, the function to record two pages of image data has been realized. In this case, a plurality of pages of, for instance, two pages of image data may be combined and two-dimensionally developed.

Figure 13:
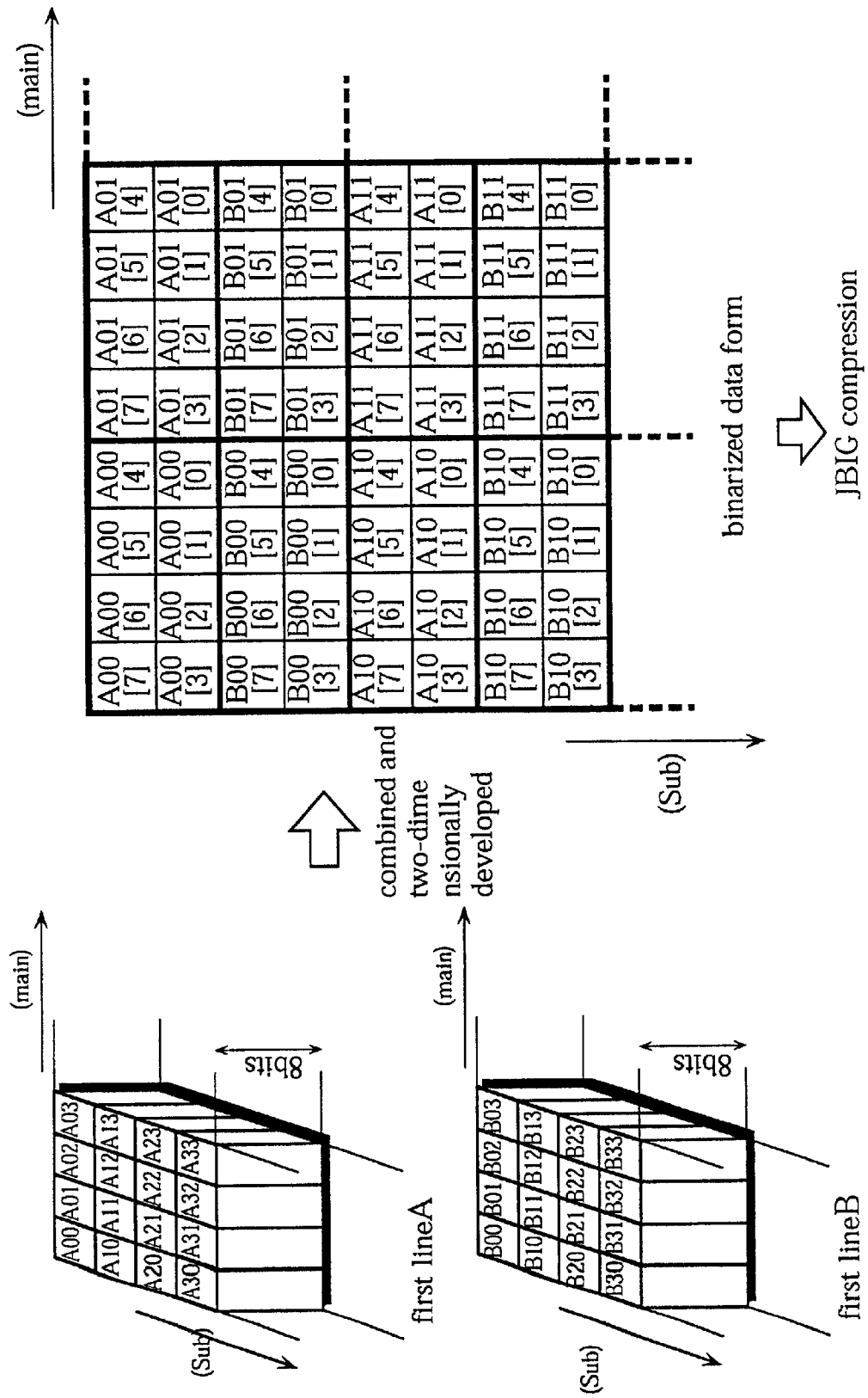
FIG. 13 is diagrams for explaining the composition and the two-dimensional development processing of image data of a plurality of pages.

More specifically, multivalued image data A and multivalued image data B are combined and two-dimensionally developed in one pixel units on the buffer memory as shown in FIG. 13. Note that this method is not limited to the case in which two pages of image data is recorded on one recording paper. This method is also effective when the compression ratio is improved for an original image that includes characters in almost fixed positions, for instance.

Moreover, when a plurality of pages of image data are combined and two-dimensionally developed, the bit arrangement is not limited to the example in FIG. 13. For instance, the bits may be arranged in one bit units as shown in FIG. 14. In FIG. 14, the reference characters "A" and "B" indicate that the pixels are in the same positions in the multivalued image data A and multivalued image data B. However, the bit arrangement also is not limited to the example in FIG. 14. A variety of manners of combination can be used according to the properties of original image.

(2) According to the principle of the JBIG compression, two-dimensional data development is not limited to the development to 2 bits high*4 bits wide. Data may be two-dimensionally developed to 4 bits high*2 bits wide, 1 bit high*8 bits wide, and 8 bits high*1 bit wide. In addition, the coding method of the present invention is applied not only to the multivalued image data in which one pixel is expressed by 8 bits. As a result, a variety of methods can be used for the two-dimensional development processing.

(3) The bit arrangement after the two-dimensional development processing is not limited to the example in the first to third embodiments, in which the bits are arranged in the order of the most to least significant bits from the upper left to the bottom right. As long as decoding is possible, the bit arrangement can be changed. Also, the code conversion can be performed. For instance, the compression ratio can be improved by converting binary data to gray codes in 4 bit units as shown in FIG. 15. Furthermore, not only bits in pixels but also pixels can be rearranged.

(4) In the second and third embodiments, an explanation of the BTC method has been given, in which a 4 pixels high*4 pixels wide block is extracted and the pixel value of each of the 16 pixels is quantized to 2 bits. The size of the extracted block can be changed and the number of bits of the quantized data can be changed. Also, the LA and LD values are used as the gradation characteristic data in the second and third embodiments. In addition, even in the case in which the BTC method is used, bits and pixels can be rearranged. Also, the code conversion can be performed. For instance, the gradation characteristic data can be converted to gray codes in 4 bit units.

(5) In the third embodiment, an explanation of coding multivalued image data with 256 gradation levels has been given in which the value of each of the pixels is expressed by 8 bits. Even in the third embodiment, the number of bits by which the value of the pixels is expressed is not limited to eight. Also, the quantization processing according to the BTC method is not limited to the case in which the pixel value of each of the pixels is quantized to 2 bits. The quantization processing can be applied to the case with ease in which the number of bits of the quantized data is increased. Furthermore, the quantization processing according to the BTC method can be applied to not only the monochrome image but also the full-color image. In this case, coding is performed for each of the reproduced colors, cyan, magenta, yellow, and black, for instance.

(6) In the second and third embodiments, the LA and LD values have been used as the gradation characteristic data. The gradation characteristic data is not limited to the LA and LD values. Other kinds of data can be used as long as the gradation characteristic of the pixels in the block can be determined. More specifically, only the greatest value (QMAX value) and the smallest value (QMIN value) among the pixel values of the pixels in the block may be kept. Also, the compression ratio can be improved by judging the kind of image (for instance, character or photograph) and changing the contents of the gradation characteristic data according to the result of the judgement.

(7) Some images include a white, or black solid part, or a solid part with medium density. In some cases, the pixel values of the pixels included in the extracted block are almost the same in the solid part. In this case, even though the quantization processing is performed on the pixel values in the BTC method, the quantization bits of all the pixels or almost all the pixels become the same. Such a condition can be referred to as the "condition in which no gradation level difference exists in the block".

On the other hand, it can be judged from the gradation characteristic data whether the gradation level difference exists. More specifically, when the LD value is smaller than a predetermined threshold value (when the difference between the QMAX and QMIN values is smaller than the predetermined threshold value if the QMAX and QMIN values are kept as the gradation characteristic data), it is judged that no gradation level difference exists in the block.

When it is judged that no gradation level difference exists, the amount of calculation by the BTC compression processing unit can be reduced by setting all the same value as the quantized data. Also, the compression ratio can be improved in the entropy coding (including the JBIG compression) by setting all the quantized data as "0" (or "1"). Accordingly, by performing this kind of processing, the compression ratio can be improved not only in the JBIG compression but also in the run length coding such as MH or MR coding method.

Figure 16:
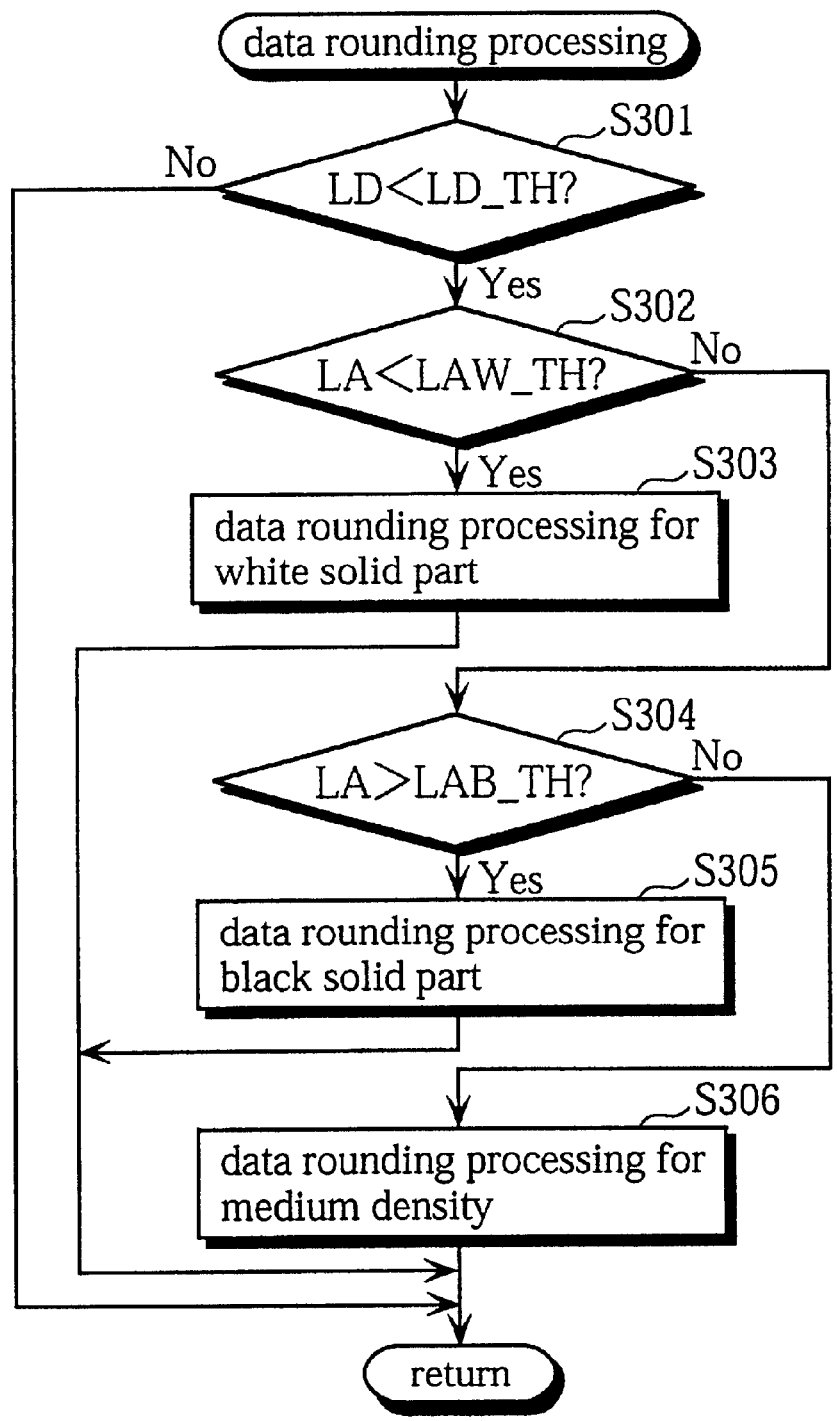
FIG. 16 is a flowchart showing an example of the data rounding processing according to the judgement of gradation level difference.

FIG. 16 is a flowchart showing an example of the data rounding processing according to the judgement of the gradation level difference. The data rounding processing can be performed at step S201 in the flowchart in FIG. 10. More specifically, it is judged whether the obtained LD value is smaller than a predetermined threshold value (LD_TH) in the example of FIG. 16 (step S301).

When the LD value is no smaller than the LD_TH value (when the result of the judgement at step S301 is "No"), the data rounding processing leads to image quality deterioration, so that no data rounding processing is performed. On the other hand, when the LD value is smaller than the LD_TH value (when the result of the judgement at step S301 is "Yes"), it is judged whether the LA value is smaller than a threshold value for white solid image recognition (LAW_TH) (step S302). The LA value indicates the average value of the pixel values in the block, so that when the LA value is smaller than the LAW_TH value (when the result of the judgement at step S302 is "Yes"), it is judged that the block corresponds to a white solid part. At step S303, the BTC data corresponding to a white solid part is generated. More specifically, both of the LA and LD values are set as "0". Also, data rounding processing can be performed by setting the same quantized data for all the pixels (all the bits of the quantized data can be set as "0" or "1").

On the other hand, when the LA value is no smaller than the LAW_TH value (when the result of the judgement at step S302 is "No"), it is judged whether the LA value is greater than a threshold value for black solid image recognition (LAB_TH) (step S304). When the LA value is greater than the LAB_TH value (when the result of the judgement at step S304 is "Yes"), it is judged that the block corresponds to a black solid part. At step S305, the BTC data indicating that the block corresponds to a black solid part is generated. More specifically, the LA value is set at the maximum value of the pixel values and the LD value is set as "0". Also, the same quantized data is set for all the pixels (all the bits of the quantized data can be set as "0" or "1").

Meanwhile, when the LA value is no greater than the LAB_TH value (when the result of the judgement at step S304 is "No"), it is judged that the block corresponds to a solid part with medium density. The data rounding processing for medium density is performed (step S306). More specifically, the LA value is left as it is and the LD value is set as "0". Also, the same quantized data is set for all the pixels. As in the case of the white and black solid parts, all the bits of the quantized data can be set as "0" or "1".

By the data rounding processing, the amount of calculation can be reduced and the compression ratio can be improved. Note that the threshold values (LD_TH, LAW_TH, LAB_TH) can be set in the registers in advance, for instance. Apart from the cases of the white and black solid parts, the number of bits of the quantized data may be set to be 1 for the binarized image. This is because the decoded image quality is little effected in the case of the binarized image.

(8) It is also possible to quantize data with a plurality of bits and then reduce the number of quantization bits of the quantized data according to the compression ratio when the bit plane consists of one of the plurality of bits of the quantized data undergoes entropy coding. This is because it can be judged whether the image to be processed is similar to the binarized image such as the character image or an image including a lot of medium density pixels such as the picture image according to the compression ratio of the bit plane.

An explanation of one specific example of the processing when the number of bits of the quantized data is reduced according to the compression ratio will be given below. FIG. 17 is a flowchart showing the coding processing including the reducing processing of quantalization data. Note that operations at steps S401 to S405 are the same as in the coding processing in the third embodiment. Accordingly, no detailed explanation of the coding processing will be given here.

In the example in FIG. 17, the compression ratio is calculated for the bit plane consisting of the most significant bit at step S406. While the bit plane consisting of the most significant bit issued in the example in FIG. 17, other bit planes may be used. This is because the compression ratio is different for the image similar to the binarized image and for the image including a lot of medium density pixels even though any kinds of bit plane is used.

After the compression ratio is calculated, the calculated compression ratio is compared with a predetermined threshold value (step S407). When the compression ratio is greater than the threshold value (when the result of the judgement at step S407 is "Yes"), it is judged that the image is a binarized image, and the coded data for the bit planes consisting of other data than the most significant bit is deleted (step S408). On the other hand, when the compression ratio is no greater than the threshold value (when the result of the judgement at step S407 is "No"), the coding processing is completed. Note that it is difficult to determine an absolute value as the threshold value. Accordingly, the threshold value needs to be determined otherwise by taking into consideration a variety of conditions such as the method of the entropy coding method. In the JBIG compression, however, the average compression ratio for the character image (eight kinds of CCITT standard test chart) is set as approximately 20 and the compression ratio for the pseudo continuous tone (the dither and the error diffusion method for SCID) is set as approximately 1.25 to 7.17. Accordingly, it is assumed that the threshold value is set as approximately 10 to 15 in the JBIG compression.

Meanwhile, in the example in FIG. 17, after performing the coding processing for all the bit planes and then unwanted coded data is deleted according to the compression ratio. For instance, however, the entropy coding may be performed on the bit plane consisting of the most significant bit first and then it may be judged according to the compression ratio whether the entropy coding is performed on the other bit planes.

(9) In the first to third embodiments, the two-dimensional development processing is performed on the gradation characteristic data so that the LA and LD values form blocks of 4 bits high*4 bits wide. Also, the two-dimensional development processing is performed on the bit data from the quantized data so as to form blocks of 4 bits high*4 bits wide. Having the same number of bits lengthwise and crosswise is convenient for the rotation processing (especially for 90-degree rotation processing) in the image forming apparatus. The method of two-dimensional development, however, is not limited to this example. There is no specific limitation on the number of bits lengthwise and crosswise. Also, the LA and LD values (or the QMAX and QMIN values) can be further divided for the two-dimensional development and the coding.

Furthermore, the arrangement of bits when two-dimensionally developed lengthwise and crosswise is not limited to the order in which the most significant bit is positioned at the upper left and the less significant bit bottom right. Considering the reason why the compression ratio can be expected to improve according to the present invention, any bit rearrangement is allowable as long as decoding can be performed. Also, the compression ratio can be further improved by performing code conversion from the ordinary binary data that corresponds to pixel values to gray codes in 4 bit units, for instance. Furthermore, for the same reason, any rearrangement of pixels can be allowable.

(10) In the first to third embodiments of the present invention, an explanation of the coder according to the present invention has been given by taking as an example a case in which the coder is applied to the store of image data in an image forming apparatus. The coder according to the present invention, however, can be realized by a program that has been installed in a general purpose information processor such as the PC via a recording medium such as the CD-ROM and the DVD-ROM or via the wired and wireless network. The program can be distributed by storing all the software necessary to the image coding processing of the present invention in a variety of recording medium in some cases. In other cases, functions of the general purpose program such as a variety of operating systems that is installed in the PC in advance can be used.

On the other hand, in view of the usage of the image forming apparatus in recent years, the following case can be thought of when the image coding processing is performed using an information processor such as the PC. Coded image data stored in the recording medium is sold. Then, the image data is decoded and the image forming is performed using an image forming apparatus in the store. This case can be also realized when a detachable recording medium is used as the code memory of the image forming apparatus in the first to third embodiments. The recording medium can be the disc recording medium such as the CD-R and the floppy disk, or the memory card such as Smart Media (a trademark) and Compact Flash, for instance. Also, coded image data can be distributed via a network in another preferred embodiment.

(11) The present invention can be applied to a variety of apparatus other than the image forming apparatus and information processor. For instance, the present invention may be applied to data coding before image data transmission in the facsimile.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A coder comprising:
    an obtaining unit that obtains a predetermined amount of image data in which each pixel is expressed by a plurality of bits;
    a developing unit that develops the pieces of bit data in the image data on virtual planes, wherein pieces of bit data of the same pixel are developed on the same virtual plane; and
    a coding unit that performs entropy coding on the developed bit data in virtual plane units.

2. The coder according to claim 1, wherein the pixel is expressed by 8 bits.

3. The coder according to claim 2, wherein the developing unit develops pieces of bit data of each pixel in a 2 bit by 4 bit matrix.

4. The coder according to claim 1, wherein the predetermined amount of image data is image data corresponding to one page.

5. The coder according to claim 1, wherein the coding unit obtains a probability value of a target bit from reference bits and performs an arithmetic coding with prediction according to the obtained probability value, wherein the target bit is a subject of coding and the reference bits are in predetermined positions relative to the target bit.

6. The coder according to claim 1, wherein the developing unit performs code conversion on the predetermined amount of image data before developing the pieces of bit data.

7. The coder according to claim 6, wherein binary data is converted to gray codes in the code conversion.

8. A coding method comprising:
    an obtaining step for obtaining a predetermined amount of image data in which each pixel is expressed by a plurality of bits;
    a developing step for developing the pieces of bit data in the image data on virtual planes, wherein pieces of bit data of the same pixel are developed on the same virtual plane; and a coding step for performing entropy coding on the developed bit data in virtual plane units.

9. An image forming apparatus comprising:
a coder that includes:
an obtaining unit that obtains a predetermined amount of image data in which each pixel is expressed by a plurality of bits;
a developing unit that develops the pieces of bit data in the image data on virtual planes, wherein pieces of bit data of the same pixel are developed on the same virtual plane;
a coding unit that performs entropy coding on the developed bit data in virtual plane units;
a decoder that decodes data that has been coded by the coder and reconstructs image data; and
an image forming unit that forms an image using the image data that has been reconstructed by the decoder.

10. A computer program embedded in a computer readable medium that performs coding processing of image data which has a computer executable steps, the steps comprising:
a developing step for developing on virtual planes pieces of bit data in image data in which each pixel is expressed by a plurality of bits, wherein pieces of bit data of the same pixel are developed on the same virtual plane; and
a coding step for performing entropy coding on the developed bit data in virtual plane units.

11. A coding comprising:
an obtaining unit that obtains a predetermined amount of image data in which each pixel is expressed by a plurality of bits;
a BTC (Block Truncation Coding) processing unit that performs BTC processing on the obtained image data to obtain gradation characteristic data and quantized data;
a developing unit that develops pieces of bit data in the obtained gradation characteristic data on virtual planes; and
a coding unit that performs entropy coding on the developed bit data in virtual plane units.

12. The coder according to claim 11, wherein the developing unit performs code conversion on the obtained gradation characteristic data before developing the pieces of bit data.

13. A coder comprising:
an obtaining unit that obtains a predetermined number of pixels of mulitvalued image data;
a BTC processing unit that generates gradation charateristic data and quantized data from pixel values of the pixels of the obtained multivalued image data;
a developing unit that develops pieces of bit data in the gradation characteristic data on first virtual planes; and
a coding unit that performs entropy coding on the developed bit data in first virtual plane units.

14. The coder according to claim 13, wherein
the developing unit develops pieces of bit data in the quantized data on at least one second virtual plane, and
the coding unit performs the entropy coding on the developed bit data in the quantized data in second virtual plane units.

15. The coder according to claim 14, wherein each piece of the quantized data corresponding to a different one of the pixels includes a plurality of pieces of bit data,
the coder further comprising a dividing unit that divides the pieces of bit data in the quantized data into a plurality of groups, wherein the developing unit develops pieces of bit data in the quantized data in a different group on a different virtual plane.

16. The coder according to claim 15, wherein the plurality of groups are a first group of upper bit data and a second group of lower bit data.

17. The coder according to claim 15, wherein
the predetermined number of pixels indicates a block of 4 pixele * 4 pixels, and
the developing unit develops pieces of bit data in each of the groups obtained from each block of the multivalued image data in a 4 bit by 4 bit matrix.

18. The coder according to claim 14, wherein each piece of the quantized data corresponding to a different one of the pixels includes a plurality of pieces of bit data,
the coder further comprising:
a compression ratio obtaining unit that obtains a compression ratio for the entropy coding; and
a judging unit that judges whether another quantized data is necessary according to the compression ratio.

19. The coder according to claim 13, wherein the developing unit performs code conversion on the pieces of bit data in the gradation characteristic data before developing the pieces of bit data in the gradation characteristic data.

20. The coder according to claim 19, wherein binary data is converted to gray codes inthe code conversion.

21. The coder according to claim 13, wherein each pixel is expressed by 8 bits in the multivalued image data.

22. The coder according to calim 13, wherein the predetermined number of pixels indicates a block of 4 pixels * 4 pixels.

23. The coder according to claim 22, wherein the developing unit develops the pieces of bit data in the gradation characteristic data obtained form each block of the multivalued image data in a 4 bit by 4 bit matrix.

24. The coder according to claim 13, further comprising a converting unit that converts the quantized data into a predetermined bit string, wherein the coding unit performs the entropy coding on the bit string.

25. A coding method comprising:
an obtained step for obtaining a predetermined number of pixels of multivalued image data;
a BTC processing step for performing BTC processing on pixel values of the pixels of the obtained multivalued image data and generating gradation characteristic data and quantized data;
a developing step for developing pieces of bit data in the gradation characteristic data in virtual planes; and
a coding step for performing entropy coding on the developed bit data in virtual plane units.

26. An image forming apparatus comprising:
a coder that includes:
an obtaining unit that obtains a predetermined number of pixels of multivalued image data;
a BTC processing unit that generates gradation characteristic data and quantized data from pixel values of the pixels of the obtained multivalued image data;
a developing unit that develops pieces of bit data in the gradation characteristic data on first virtual planes;
a coding unit that performs entropy coding on the developed bit data in first virtual plane units;

a decoder that decodes data that has been coded by the coder and reconstructs image data; and an image forming unit that forms an image using the image data that has been reconstructed by the decoder.

27. A computer program embedded in a computer readable medium that performs coding processing of image data which has a computer executable steps, the steps comprising:

an obtaining step for obtaining a predetermined number of pixels of multivalued image data;

a BTC processing step for generating gradation characteristic data and quantized data from pixel values of a plurality of pixels of multivalued image data;

a developing step for developing pieces of bit data in the gradation characteristic data on virtual planes; and a coding step for performing entropy coding on the bit data in virtual plane units.

* * * * *